(12) United States Patent
Kim et al.

(10) Patent No.: US 9,834,096 B2
(45) Date of Patent: Dec. 5, 2017

(54) BRAKING CONTROL METHOD FOR ECO-FRIENDLY VEHICLE

(71) Applicant: HYUNDAI MOTOR COMPANY, Seoul (KR)

(72) Inventors: Sang Joon Kim, Seoul (KR); Jee Wook Huh, Bucheon-si (KR); Teh Hwan Cho, Anseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/843,963

(22) Filed: Sep. 2, 2015

(65) Prior Publication Data

US 2016/0121727 A1 May 5, 2016

(30) Foreign Application Priority Data

Oct. 30, 2014 (KR) .................. 10-2014-0148947

(51) Int. Cl.
| | | |
|---|---|---|
| *B60L 7/00* | (2006.01) | |
| *B60L 7/26* | (2006.01) | |
| *B60L 7/16* | (2006.01) | |
| *B60L 7/18* | (2006.01) | |

(52) U.S. Cl.
CPC ........ *B60L 7/26* (2013.01); *B60L 7/16* (2013.01); *B60L 7/18* (2013.01); *B60L 2240/425* (2013.01); *B60L 2240/545* (2013.01); *B60L 2250/26* (2013.01); *Y02T 10/642* (2013.01); *Y02T 10/7258* (2013.01); *Y02T 90/16* (2013.01)

(58) Field of Classification Search
CPC ...... B60L 7/26; B60L 7/18; B60L 7/16; B60L 7/24; H02P 3/14
See application file for complete search history.

(56) References Cited

U.S. PATENT DOCUMENTS

| | | | |
|---|---|---|---|
| 2012/0108391 A1* | 5/2012 | Nagashima | ............ B60K 6/48 477/176 |
| 2015/0057857 A1* | 2/2015 | Katsuta | ................. F01N 3/2013 701/22 |

FOREIGN PATENT DOCUMENTS

WO WO/2013/076836 * 5/2013 ............ B60W 10/18

* cited by examiner

*Primary Examiner* — Behrang Badii
*Assistant Examiner* — Daniel L Greene
(74) *Attorney, Agent, or Firm* — McDermott Will & Emery LLP (57) ABSTRACT

A braking control method of an eco-friendly vehicle includes calculating, if a braking manipulation performed by a driver is sensed, a motor torque command according to a regenerative braking permissible amount. If it is determined that a motor has been normally driven, a regenerative braking execution amount is calculated from the motor torque command. Motor control for regenerative braking is performed according to the motor torque command. A friction braking amount satisfying the total braking amount is calculated from the regenerative braking execution amount according to the braking manipulation performed by the driver, thereby controlling friction braking to generate braking power corresponding to the friction braking amount.

6 Claims, 5 Drawing Sheets

BRAKING CONTROL METHOD FOR ECO-FRIENDLY VEHICLE

CROSS-REFERENCE TO RELATED APPLICATION

This application claims under 35 U.S.C. §119(a) the benefit of priority to Korean Patent Application No. 10-2014-0148947 filed Oct. 30, 2014, the entire content of which is incorporated herein by reference.

TECHNICAL FIELD

The present disclosure relates to a braking control method for an eco-friendly vehicle. More particularly, the present disclosure relates to a braking control method for an eco-friendly vehicle, which can improve braking distribution and braking performance.

BACKGROUND

An internal-combustion engine vehicle using fossil fuel such as gasoline or diesel creates air pollution due to exhaust gas, global warming due to carbon dioxide, respiratory diseases due to generation of ozone, and the like.

An eco-friendly vehicle has been developed, such as an electric vehicle (EV) driven by electric power, i.e., by driving an electric motor, a hybrid electric vehicle (HEV) driven by an internal-combustion engine and an electric motor, and a fuel cell electric vehicle (FCEV) driven by driving an electric motor using electric power generated from a fuel cell.

In such an eco-friendly vehicle, braking or inertia energy during braking of the vehicle or during coasting by inertia can be collected as electric power is generated by an electric motor and then charged in a battery (motor charge) in a regenerative mode.

As such, energy is collected using the electric motor in the braking or coasting of the eco-friendly vehicle, and the battery is charged with the collected energy. Thus, the energy is efficiently used, and thus, the fuel efficiency of the vehicle can be improved.

More specifically, the eco-friendly vehicle has a regenerative braking system converting kinetic energy of into electrical energy during braking of the vehicle and storing the converted energy in the battery. The regenerative braking system enables the stored energy to be used in driving the electric motor, thereby improving the fuel efficiency of the vehicle.

A vehicle controller (hybrid control unit (HCU) or vehicle control unit (VCU)) for controlling all operations of vehicle is provided in the vehicle. In addition, the eco-friendly vehicle has a variety of controllers for controlling various devices of the vehicle.

For example, the eco-friendly vehicle has a brake controller for controlling the operation of a friction brake (friction braking device), a motor controller (motor control unit (MCU)) for controlling the operation of a motor, a transmission controller (transmission control unit (TCU)) for controlling the operation of a transmission, a battery controller (battery management system (BMS)) for collecting information on battery state of charge (SOC). The eco-friendly vehicle then uses the collected information in battery charging/discharging control or provides the collected information to the other controllers, and the like.

The vehicle controller and each controller perform cooperation control while communicating information with each other through controller area network (CAN) communication. An upper-level controller among the controllers transmits control commands to the lower-level controllers while receiving and collecting various information transmitted from the lower-level controllers.

Figure 1:
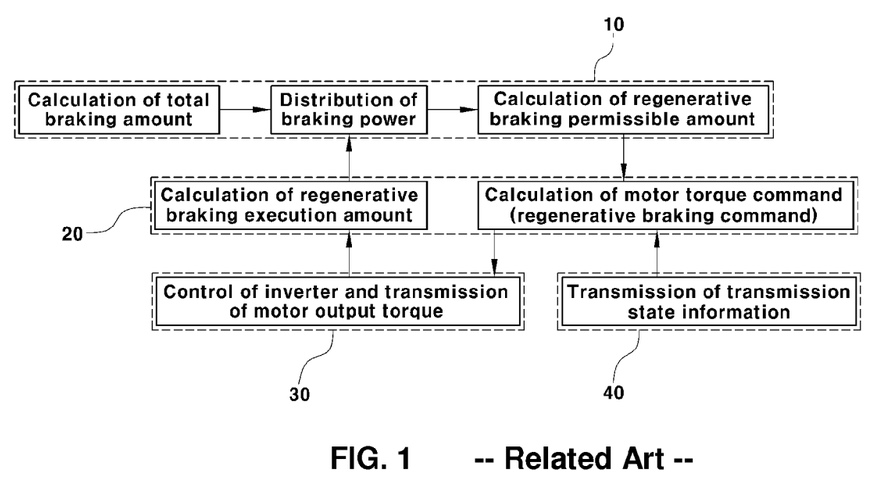
FIG. 1 is a schematic view illustrating main functions of controllers in an eco-friendly vehicle.

Main functions of controllers related to regenerative braking in the eco-friendly vehicle will be briefly described with reference to FIG. 1. When a driver braking request is generated, a brake controller 10 calculates a regenerative braking permissible amount and transmits the calculated regenerative braking permissible amount to a vehicle controller 20.

In consideration of a regenerative prohibition situation, etc., the vehicle controller 20 calculates a motor request torque, i.e., a motor torque command (regenerative braking command) according to the regenerative braking permissible amount, and transmits the calculated motor torque command (regenerative braking command) to a motor controller 30. The vehicle controller 20 estimates a regenerative braking execution amount according to each state of a motor, a transmission.

The motor controller 30 controls the motor through an inverter according to the motor torque command (regenerative braking command) received from the vehicle controller 20, and transmits information on a motor output torque (actual motor torque) so that the vehicle controller 20 can estimate the regenerative braking execution amount.

The brake controller 10 calculates a total braking amount according a driver braking request (manipulation of a brake pedal), and distributes braking power according to the total braking amount, i.e., distribution of regenerative braking power and friction braking power with reference to the regenerative braking execution amount transmitted from the vehicle controller 20.

That is, the brake controller 10 determines a friction braking amount obtained by subtracting the regenerative braking execution amount from the total braking amount according to the driver braking request, and then controls the operation of a friction brake (friction braking device) to generate braking power corresponding to the friction braking amount.

A transmission controller 40 controls a vehicle transmission such as an automatic transmission (AT) or a dual clutch transmission (DCT), and transmits information on a transmission state (transmission gear ratio), etc. to the vehicle controller 20 so that the vehicle controller 20 can estimate the regenerative braking execution amount.

For a decelerator-type electric vehicle, there is no transmission controller.

In the conventional eco-friendly vehicle, the brake controller 10 calculates a regenerative braking permissible amount, the vehicle controller 20 calculates a regenerative braking command (motor torque command) according to the regenerative braking permissible amount, and the motor controller 30 performs motor control according to the motor torque command.

If the motor controller 30 calculates the actual motor torque (actual output torque) and transmits the calculated actual motor torque (actual output torque) to the vehicle controller 20, the vehicle controller 20 calculates the regenerative braking execution amount using information on each state of the motor and the transmission, i.e., information on the actual motor torque and the transmission gear ratio, and then transmits the calculated regenerative braking execution amount to the brake controller 10. The brake controller 10 distributes the braking power using the regenerative braking execution amount and then controls the friction brake to generate the distributed friction braking power.

Here, the regenerative braking execution amount in the vehicle controller 20 is calculated from 'regenerative braking execution amount=motor actual torque×transmission gear ratio (or speed reduction ratio)−coasting torque.' In the case of an HEV, when an engine is connected to a motor through coupling of an engine clutch, a fuel cut state of the engine is reflected to the actual motor torque.

However, communication delay exists between the controllers, and the vehicle controller 20 calculates a regenerative braking execution amount based on an actual torque of the motor controller 30. Hence, a considerably long period of time is required until the brake controller 10 calculates a total braking amount and then distributes the braking power by receiving the regenerative braking execution amount from the vehicle controller 20. Therefore, accurate distribution of braking power and actual reduction in speed of the vehicle are not performed in an urgent moment.

Figure 2:
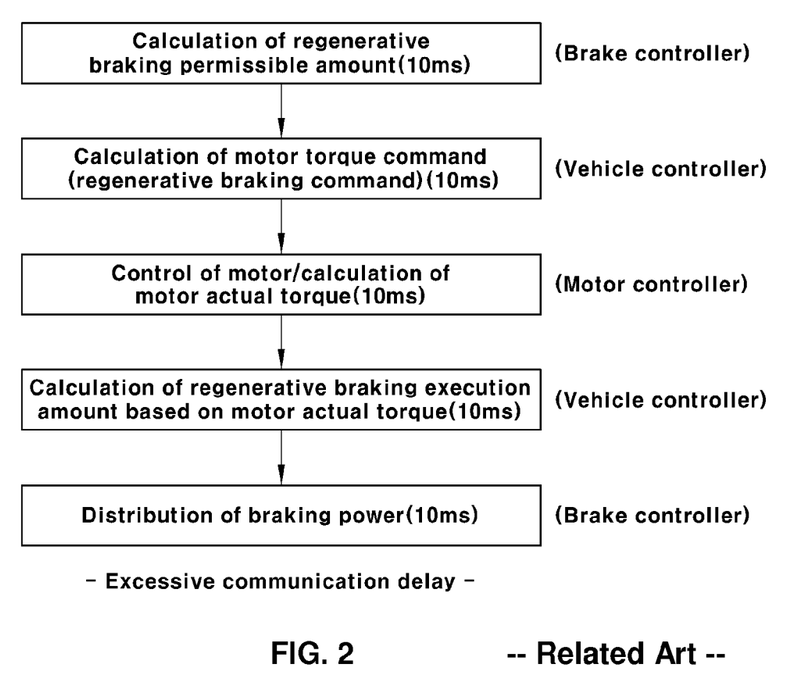
FIG. 2 is a view illustrating conventional problems caused by communication delay between the controllers.

For example, if it is assumed that, when the vehicle controller 20 calculates the regenerative braking execution amount based on the actual motor torque transmitted from the motor controller 30, the CAN communication period between the controllers is 10 ms which is a duration in which the regenerative braking execution amount is fed back to the brake controller 10 after generation of a driver braking request is as shown in FIG. 2.

That is, there exists a delay of 50 ms or less which is generated from 'driver braking input→calculation of regenerative braking permissible amount in brake controller (10 ms)→calculation of regenerative braking command (motor torque command) in vehicle controller (10 ms)→control of motor and calculation of motor actual torque in motor controller (10 ms)→calculation of regenerative braking execution amount in vehicle controller (10 ms)→distribution of braking power in brake controller (10 ms)'.

The communication delay causes considerable inaccuracy in view of braking distribution, and the braking performance of the vehicle is deteriorated.

SUMMARY OF THE DISCLOSURE

The present disclosure provides a braking control method for an eco-friendly vehicle, which can solve problems of inaccuracy in braking distribution and deterioration of braking performance due to communication delay between controllers.

According to an exemplary embodiment of the present inventive concept, a braking control method for an eco-friendly vehicle includes calculating, if braking manipulation performed by a driver is sensed, a motor torque command according to a regenerative braking permissible amount. If it is determined that a motor runs normally, a regenerative braking execution amount is calculated from the motor torque command. A motor control for a regenerative braking is performed according to the motor torque command, and a friction braking amount satisfying the total braking amount is calculated from the regenerative braking execution amount according to the braking manipulation performed by the driver, thereby controlling a friction braking to generate braking power corresponding to the friction braking amount.

According to the braking control method of the present disclosure, a motor torque command is used when a vehicle controller calculates a regenerative braking execution amount, so that it is possible to reduce the time when the regenerative braking execution amount is fed back to a brake controller after generation of a driver braking request. Further, it is possible to secure more improved braking performance through reduction in communication delay.

Other aspects and exemplary embodiments of the inventive concept are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents, and other embodiments, which may be included within the spirit and scope of the invention as defined by the appended claims.

The present disclosure provides a braking control method for an eco-friendly vehicle, which can solve problems of inaccuracy in braking distribution and deterioration of braking performance due to communication delay between controllers.

Figure 3:
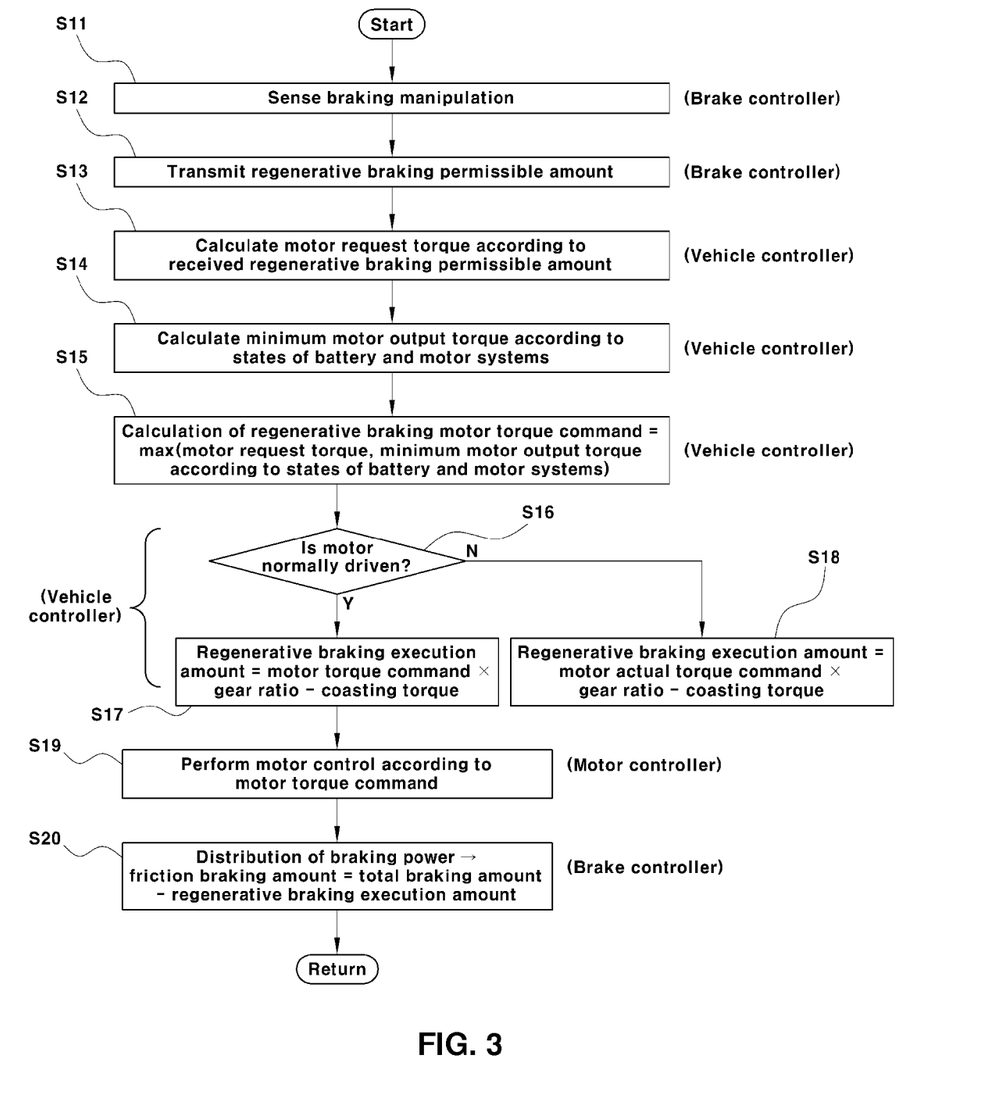
FIG. 3 is a flowchart illustrating a braking control process according to an embodiment of the present inventive concept.
Figure 4:
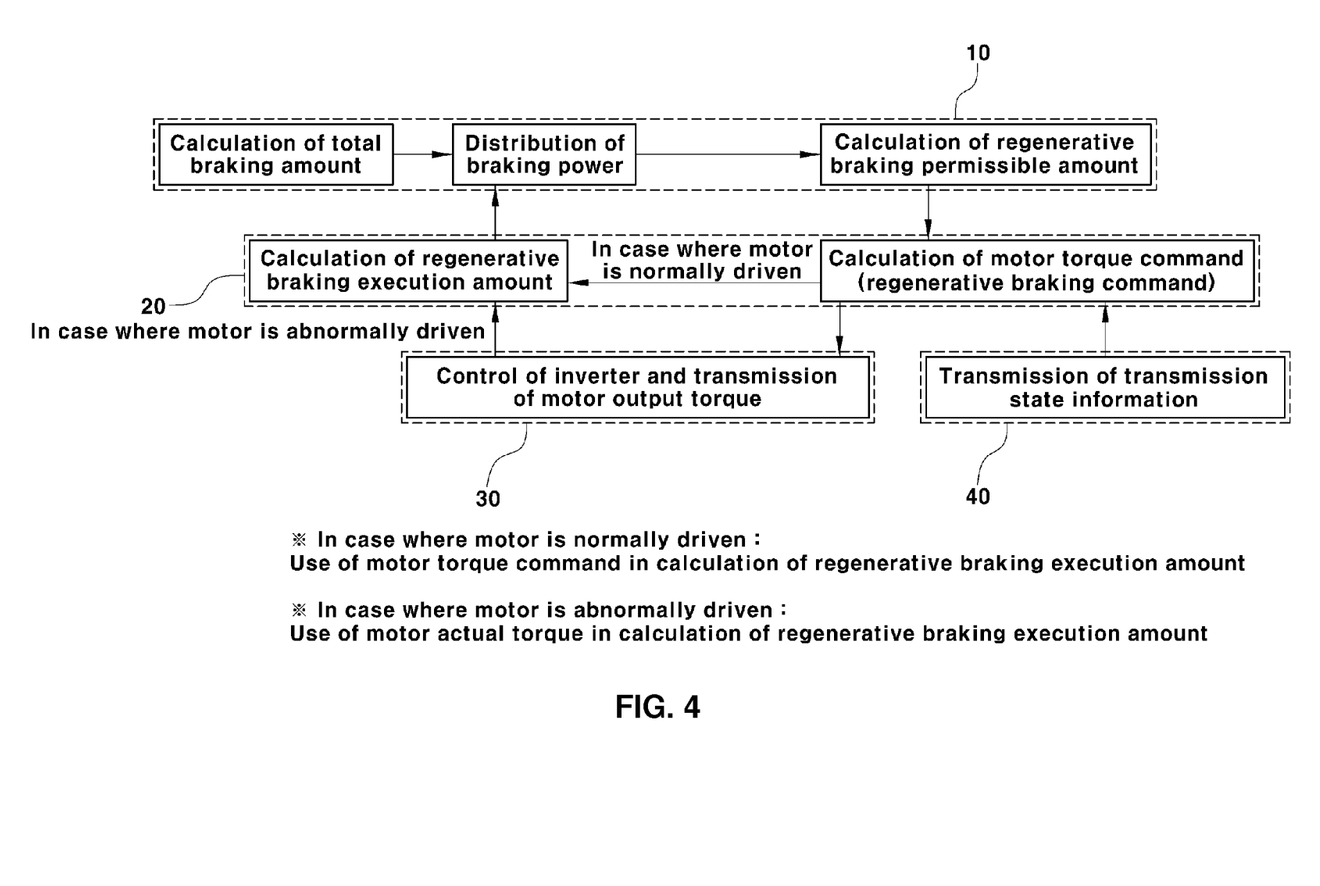
FIG. 4 is a schematic view illustrating main functions of controllers according to an embodiment of the present inventive concept.

FIG. 3 is a flowchart illustrating a braking control process according to an embodiment of the present inventive concept. FIG. 4 is a schematic view illustrating main functions of controllers according to an embodiment of the present inventive concept.

In the present disclosure, if a motor runs normally when a vehicle controller 20 calculates a regenerative braking execution amount, a motor torque command is used rather than using an actual motor torque transmitted from a motor controller 30.

Here, the motor torque command (regenerative braking command) is calculated by the vehicle controller 20. A brake controller 10 calculates a regenerative braking permissible amount in generation of a driver braking request and transmits the calculated regenerative braking permissible amount to the vehicle controller 20. The vehicle controller 20 determines a motor torque command (regenerative braking command) using information on the regenerative braking permissible amount received from the brake controller 10 and information on states of battery and motor systems and then transmits the determined motor torque command to a motor controller 30. The motor controller 30 controls the motor through an inverter according to the motor torque command received from the vehicle controller 20.

The vehicle controller 20 calculates a regenerative braking execution amount using the motor torque command and then transmits the calculated regenerative braking execution amount to the brake controller 10. The brake controller 10 performs distribution of braking power using information on a total braking amount according to a driver braking input (manipulation of a brake pedal) and the regenerative braking execution amount received from the vehicle controller 20 and then controls a friction brake (friction braking device) to generate distributed friction braking power.

Main functions of controllers will be described in detail with reference to FIG. 4. When a driver braking request is generated, similar to the conventional art, the brake controller 10 calculates a regenerative braking permissible amount and transmits the calculated regenerative braking permissible amount to the vehicle controller 20.

Accordingly, in consideration of a regenerative prohibition situation, etc., the vehicle controller 20 determines a motor request torque using information on the regenerative braking permissible amount transmitted from the brake controller 10 and information on states of the battery and motor systems, and transmits the motor torque command to the motor controller 30.

In addition, the vehicle controller 20 calculates a regenerative braking execution amount using information on a transmission state (transmission gear ratio) or speed reduction ratio (for an electric vehicle to which a decelerator is used) and information on a motor torque command (in a case where the motor runs normally) or an actual motor torque (in a case where the motor runs abnormally) and then transmits the calculated regenerative braking execution amount to the brake controller 10.

The motor controller 30 controls the motor through the inverter according to the motor torque command received from the vehicle controller 20, and transmits information on the motor actual torque, etc. so that the vehicle controller 20 can estimate the regenerative braking execution amount.

A transmission controller 40 performs transmission control on a transmission, and transmits information on a transmission state, etc. (information on a gear ratio, etc.) to the vehicle controller 20 so that the vehicle controller 20 can estimate the regenerative braking execution amount (there is no transmission controller in the electric vehicle).

The brake controller 10 calculates a total braking amount according to a driver braking input (manipulation of the brake pedal), and performs distribution of regenerative braking power and friction braking power, which can satisfy the total braking amount, with respect to the regenerative braking execution amount.

The brake controller 10 controls the operation of the friction brake (friction braking device) to generate the distributed friction braking power.

According to the present disclosure, when the motor is driven normally, the regenerative braking execution amount in the vehicle controller 20 is calculated from 'regenerative braking execution amount=motor torque command×transmission gear ratio (or speed reduction ratio)−coasting torque'.

However, when the motor is driven abnormally, the regenerative braking execution amount in the vehicle controller 20 is calculated from 'regenerative braking execution amount=motor actual torque×transmission gear ratio (or speed reduction ratio)−coasting torque,' similar to the conventional art.

In a hybrid electric vehicle, when an engine is connected to a motor through coupling of an engine clutch, a fuel cut state of the engine may be reflected to the actual motor torque.

When the vehicle controller 20 calculates the regenerative braking execution amount as described above, the motor torque command is used instead of using the actual motor torque transmitted from the motor controller 30. Here, the motor torque command is determined based on a state of a high voltage system (the battery and motor) in order to improve the reliability in the use of the motor torque command.

Thus, it is important to determine the motor torque command so that the motor torque command can be the motor actual command. The vehicle controller 20 continuously monitor the actual motor torque to prevent a situation, in which there exists a difference between the motor torque command and the motor actual torque due to abnormal driving of a motor system, from occurring, thereby to prevent fail-safe.

Figure 5:
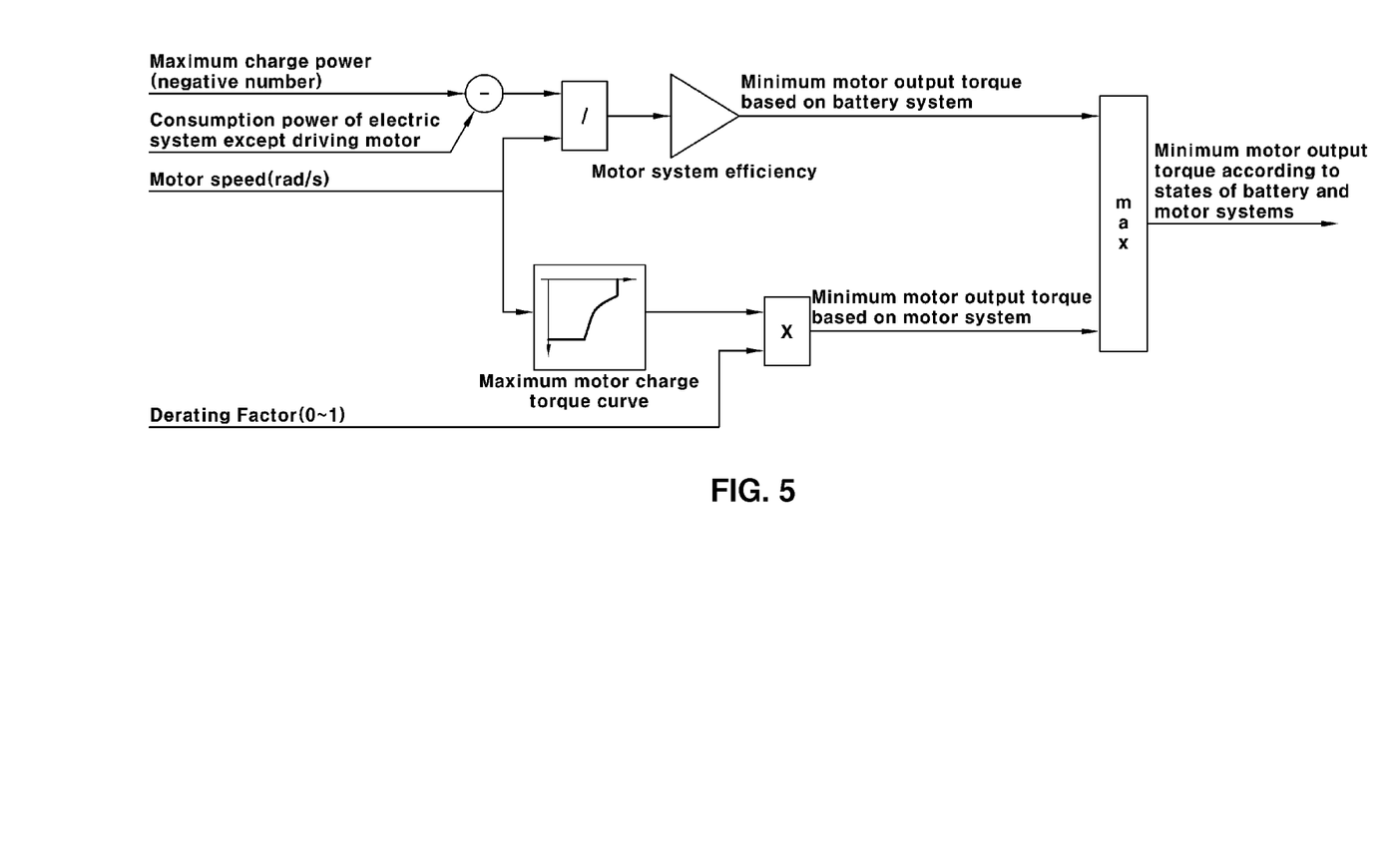
FIG. 5 is a view illustrating a calculation method of a minimum motor output torque based on sates of battery and motor systems according to an embodiment of the present inventive concept

Here, it is required to calculate a minimum motor output torque (output torque having a negative value and a maximum absolute value) according to states of the battery and motor systems. The vehicle controller 20, as shown in FIG. 5, calculates the minimum motor output torque (having a negative value) based on the battery system using information on maximum battery charge power (having a negative value), consumption power of an electric system in the vehicle except the motor (driving motor), motor speed (rad/s), and motor system efficiency.

The maximum battery charge power is determined from battery information including battery capacity, battery state of charge (SOC), battery temperature, etc.

In addition, the vehicle controller 20 determines a maximum motor charge torque according to a motor speed (rad/s) from a maximum charge torque curve, and calculates the minimum motor output torque (having a negative value) by multiplying the maximum motor charge torque by a derating factor (DF) determined according to a motor state including motor temperature, etc.

According to the present disclosure, the maximum motor charge torque curve shows data obtained by setting a maximum motor charge torque (charge torque maximum value based on its absolute value) according to motor speed. The maximum motor charge torque corresponding to the motor speed may be determined using the maximum motor charge torque curve. Here, the maximum motor charge torque means a maximum value based on its absolute value, and becomes a minimum motor output torque when the maximum motor charge torque is represented by a negative value.

The DF is a factor determined to reduce a motor torque and limit a motor output according to a motor state. The DF is determined according to the motor state including motor temperature, etc. When the DF is 0, the motor output is prohibited. When the DF is 1, the motor output is performed in the entire area. When the DF is a value between 0 and 1, the motor output is limited.

Accordingly, if the minimum motor output torque based on the battery system and the minimum motor output torque based on the motor system are obtained, the vehicle controller 20 determines a greater value (max. value) out of the two values as a final minimum motor output torque according to the states of the battery and motor systems.

Like the conventional art, the vehicle controller 20 calculates a regenerative braking motor request torque (having a negative value) according to the regenerative braking permissible amount received from the brake controller 10. The vehicle controller 20 determines, as a final motor torque command, a greater value (max. value) out of the motor request torque based on the regenerative braking permissible amount and the minimum motor output torque according the states of the battery and motor systems, determined through the calculation method of a minimum motor output torque as shown in FIG. 5. The maximum motor charge torque (maximum charge torque value based on its absolute value) obtained by considering battery and motor states is calculated.

If the motor torque command is determined as described above, the vehicle controller 20 determines whether the motor is driven normally. When the motor is driven normally, the vehicle controller 20 calculates the motor torque command. When the motor is driven abnormally, the vehicle controller 20, the vehicle controller 20 calculates the regenerative braking execution amount using the actual motor torque like the conventional art.

Here, the vehicle controller 20 monitors the actual motor torque transmitted from the motor controller 30. When the motor actual torque is maintained for a predetermined time or more in a state in which a variation between the motor torque command and the motor actual torque is a reference value or more, the vehicle controller 20 determines that the motor is driven abnormally. In this case, the regenerative braking execution amount is calculated by replacing the motor torque command with the motor actual torque.

Hereinafter, the braking control process according to the present disclosure will be described with reference to FIG. 3.

First, if a driver manipulates the brake pedal, the brake controller 10 senses a braking manipulation (braking input of the driver) (S11). Then, the brake controller 10 calculates a regenerative braking permissible amount and transmits the calculated regenerative braking permissible amount to the vehicle controller 20 (S12).

Accordingly, the vehicle controller 20 determines a motor torque command from information on the regenerative braking permissible amount received from the brake controller 10 and information on states of the battery and motor. In this state, the vehicle controller 20 calculates a motor request torque based on the information on the regenerative braking permissible information (S13). In addition, the vehicle controller 20 calculates a minimum motor output torque according to states of the battery and motor systems through the process of FIG. 5 (S14).

Subsequently, the vehicle controller 20 determines, as a final motor torque command, a greater value (max. value) out of the motor request torque and the minimum motor output torque according to the states of the battery and motor systems (S15).

Subsequently, the vehicle controller 20 determines whether the motor is driven normally by identifying whether an actual motor torque is maintained for a predetermined time or more when the variation between the motor torque command and the motor actual torque is a reference value or more (S16). When the motor is driven normally, the vehicle controller 20 calculates the motor torque command (S17). When the motor is abnormally driven, the vehicle controller 20 calculates a regenerative braking execution amount using the actual motor torque (S18).

The motor controller 30 controls the motor according to the motor torque command received from the vehicle controller 20 (S19), calculates the motor actual torque, and transmits the calculated motor actual torque to the vehicle controller 20.

The regenerative braking execution amount calculated in the vehicle controller 20 is transmitted to the brake controller 10, and the brake controller 10 performs distribution of braking power. Hence, the brake controller 10 controls friction brake to satisfy a friction braking amount by subtracting the regenerative braking execution amount from the total braking amount according to a braking manipulation performed by the driver (S20). Accordingly, friction braking power is generated together with regenerative braking power, thereby reducing a speed of the vehicle.

Figure 6:
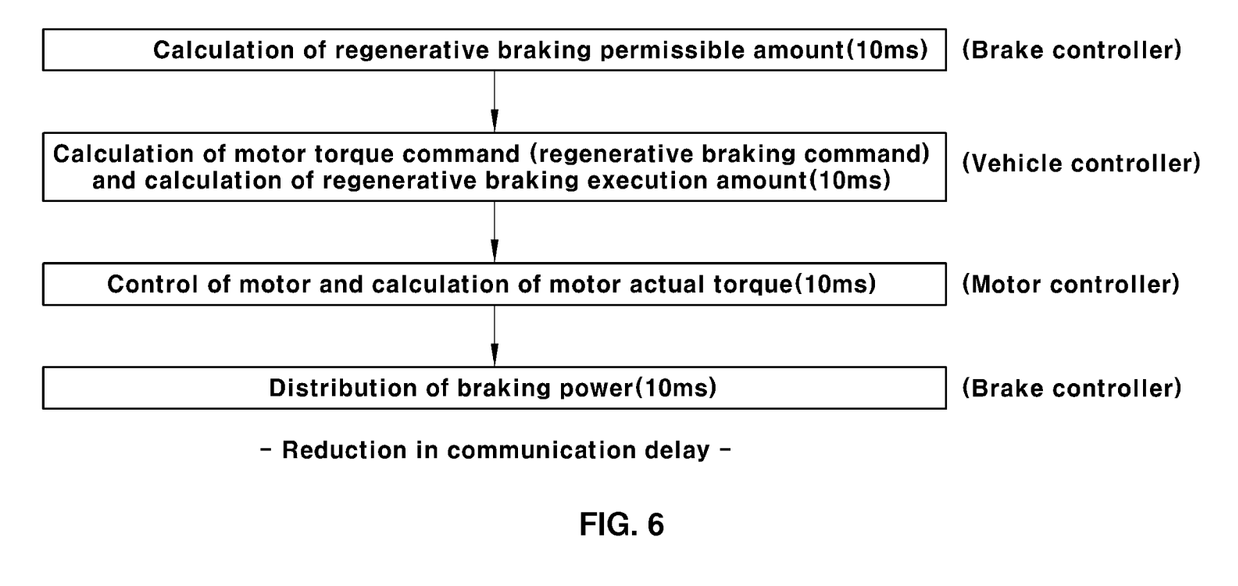
FIG. 6 is a view illustrating a communication delay reduction effect according to an embodiment of the present inventive concept.

FIG. 6 is a view illustrating a communication delay reduction effect according to the embodiment of the present inventive concept. The motor torque command is used when the vehicle controller calculates a regenerative braking execution amount in a state in which the motor is driven normally. Then, the time when the regenerative braking execution amount after generating driver braking request is fed back to the brake controller can be reduced as compared with the conventional art (see FIG. 2). Accordingly, it is possible to improve braking performance through reduction in communication delay.

The inventive concept has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A braking control method for an eco-friendly vehicle, comprising steps of:
  calculating, if a braking manipulation performed by a driver is sensed, a motor torque command for regenerative braking according to a regenerative braking permissible amount;
  calculating, if it is determined that a motor runs normally, a regenerative braking execution amount based on the motor torque command;
  performing motor control for regenerative braking according to the motor torque command;
  calculating a friction braking amount satisfying a total braking amount from the regenerative braking execution amount according to the braking manipulation performed by the driver; and
  controlling friction braking to generate a braking power corresponding to the friction braking amount,
  wherein it is determined that the motor runs abnormally if a deviation of the motor torque command from the actual motor torque is at or above a reference value and maintained for a predetermined time or longer, and it is determined that the motor runs normally, if the deviation of the motor torque command from the actual motor torque is below the reference value or not maintained for the predetermined time or longer, wherein, when the motor runs normally, the regenerative braking execution amount is calculated from 'regenerative braking execution amount=motor torque command×transmission gear ratio or speed reduction ratio−coasting torque,' and wherein, when the motor runs abnormally, the regenerative braking execution amount is calculated from 'regenerative braking execution amount=actual motor torque×transmission gear ratio or speed reduction ratio−coasting torque'.

2. The braking control method of claim 1, wherein a brake controller transmits the regenerative braking permissible amount, a vehicle controller calculates and transmits the motor torque command and the regenerative braking execution amount from the regenerative braking permissible amount received from the brake controller, a motor controller performs the motor control for the regenerative braking according to the motor torque command received from the vehicle controller, and the brake controller calculates the friction braking amount from the regenerative braking execution amount received from the vehicle controller to control the friction braking.

3. The braking control method of claim 1, wherein the step of calculating the motor torque command includes:

calculating a requested motor torque according to the regenerative braking permissible amount;

calculating a minimum motor output torque based on states of a battery and the motor; and determining, for the motor torque command, a greater value between the requested motor torque and the minimum motor output torque based on the states of the battery and motor.

4. The braking control method of claim 3, wherein the step of calculating the minimum motor output torque based on the states of the battery and motor includes steps of:

calculating a first minimum motor output torque using information on a maximum battery charge power, a consumption power of the vehicle except the motor, a motor speed, and motor system efficiency;

calculating a second minimum motor output torque by multiplying a maximum motor charge torque obtained from the motor speed by a derating factor determined based on the information on the state of the motor including a motor temperature; and determining a greater value between the first minimum motor output torque and the second minimum motor output torque for the minimum motor output torque based on the states of the battery and motor.

5. The braking control method of claim 4, wherein the minimum motor output torque has a negative value.

6. The braking control method of claim 4, wherein the maximum motor charge torque has a negative value.

* * * * *